United States Patent [19]

Lee

[11] Patent Number: 5,418,903
[45] Date of Patent: May 23, 1995

[54] APPARATUS AND METHOD FOR MANAGING MEMOS

[75] Inventor: Dong-gil Lee, Kyunggi, Rep. of Korea

[73] Assignee: Samsung Electronics Co., Ltd., Kyunggi, Rep. of Korea

[21] Appl. No.: 819,966

[22] Filed: Jan. 13, 1992

[30] Foreign Application Priority Data

Jan. 29, 1991 [KR] Rep. of Korea ............... 91-1511
Nov. 30, 1991 [KR] Rep. of Korea ............. 91-21984

[51] Int. Cl.$^6$ ................................................ G06F 17/60
[52] U.S. Cl. ............................................................ 395/155
[58] Field of Search ............... 395/155, 161, 157, 154, 395/159

[56] References Cited

U.S. PATENT DOCUMENTS

| | | | |
|---|---|---|---|
| 4,807,154 | 2/1989 | Scully et al. | 395/161 |
| 5,050,104 | 9/1991 | Heyen et al. | 395/162 |
| 5,165,012 | 11/1992 | Crandall et al. | 395/161 X |
| 5,181,273 | 1/1993 | Ohtani | 395/155 X |
| 5,222,209 | 6/1993 | Murata et al. | 395/155 X |

FOREIGN PATENT DOCUMENTS 4011102 10/1991 Germany.

OTHER PUBLICATIONS

Microsoft Windows (Trademark of Microsoft Cor.), 1990, pp. 370 & 376.

*Primary Examiner*—Heather R. Herndon
*Assistant Examiner*—Cliff N. Vo
*Attorney, Agent, or Firm*—Sughrue, Mion, Zinn, Macpeak & Seas

[57] ABSTRACT

By adapting an apparatus and method for managing memos to a video processing apparatus, memo data relating to meetings and events are input and stored, and then reported to the user around the designated day recorded in the memo data. For this function, the apparatus includes a video processor and an audio processor to respectively process a video signal and an audio signal, both for a video program, an operation device to receive the memo data designated by a user, a microcomputer which stores and manages the memo data from the operation device, for timely generating character and audio information, and which generates an alarm control signal to confirm the memo data in accordance with the stored date, an on-screen-display (OSD) circuit to convert the character information from the microcomputer into video signal form, a video switch for switching between the output of the OSD and the output of the video processor, an audio information processor for converting the audio information from the microcomputer into audio signal form, an audio switch for switching between the output of the audio processor and the output of the audio information processor, and an alarm operated by an alarm control signal for indicating the existence of a desired memo. The memo data input by a viewer are periodically searched to remind the viewer of the memo contents in advance of the date within the memo by generating video and audio messages.

5 Claims, 3 Drawing Sheets

APPARATUS AND METHOD FOR MANAGING MEMOS

BACKGROUND OF THE INVENTION

The present invention relates to a video processing apparatus, and particularly to an apparatus and a method for managing memos, which can store memos as needed by a user and timely give the user a reminder.

A widely known video processing apparatus includes a television receiver for receiving a television broadcast and a video tape recorder (VTR) in which video programs are recorded on and reproduced from a magnetic recording medium. With the general use of the television receiver and VTR, there has been a trend to add various functions for the user's convenience, which in turn has brought about the adoption of a microcomputer for controlling the intricate systems within the television receiver and VTR.

Despite various aids now available to organize and schedule one's time, most people still rely upon memory or loose notes to remember appointments and other obligations. Accordingly, one will occasionally lose a memo or forget the date of an appointment and thus forget to attend.

SUMMARY OF THE INVENTION

Therefore, it is an object of the present invention to provide an apparatus and a method for managing memos, which receives and stores memo data relating to all kinds of events and meetings, and manages the stored memo data to timely inform a user of the stored memo data in accordance with the memo contents, using a television receiver or VTR.

To achieve this object, there is provided an apparatus for managing memos in a video processing apparatus including a video processor for processing video signals for a video program and an audio processor for processing audio signals for a video program, which comprises: an operation device for receiving memo data concerning various meetings and events designated by a user; a microcomputer which stores and manages the memo data entered from the operation device, for timely and selectively generating character and audio information relating to the memo contents for the memorized date, and an alarm control signal to confirm the memo data; an OSD (On Screen Display) circuit for converting the character information generated from the microcomputer into a video signal form; a video switch for selecting between the output of the OSD circuit and the output of the video processor; an audio information processor for converting the audio information generated from the microcomputer into an audio signal form; an audio switch for selecting between the output of the audio processor and the output of the audio information processor; and alarm means operated by an alarm control signal for indicating the existence of a currently relevant memo.

The method according to the present invention comprises the steps of: checking storage commands to determine whether or not an input or display request for memo data exists; inputting memos when the memo data input is requested in the step of checking storage commands; displaying memos sequentially by pages on a screen when the memo-display is requested in the step of checking storage commands; checking an alarm time to determine whether or not it has become a stored alarm time when neither an input nor a display request exists in the step of checking storage commands; and informing the user of the memo after checking among the stored memo contents for a memo which should be used as a reminder, when the alarm time is reached in the step of checking the alarm time.

BRIEF DESCRIPTION OF THE DRAWINGS

Other objects and advantages of the present invention will become more apparent by the following description with reference to accompanying drawings, in which.

DETAILED DESCRIPTION OF THE INVENTION

Figure 1:
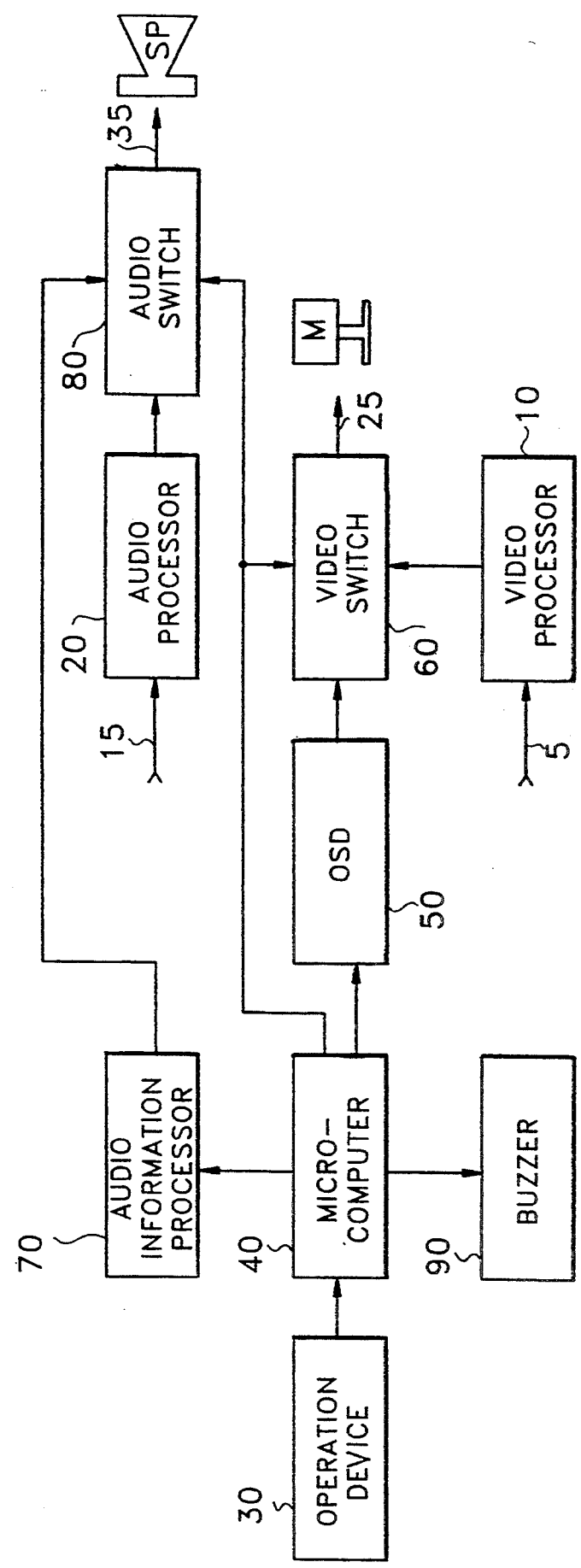
FIG. 1 is a block diagram showing an embodiment of an apparatus for managing memos according to the present invention.

In FIG. 1, the output terminal of an operation device 30, which may be an integral control panel or remote control unit for a TV or VTR, is connected (by wireless connection in the case of a remote control unit) to an input terminal of a microcomputer 40. First through third outputs of microcomputer 40 are connected to the inputs of an OSD (On-Screen-Display) circuit 50, an audio information processor 70, and a buzzer or lamp 90, respectively. A control signal output of microcomputer 40 is connected to control inputs of video switch 60 and an audio switch 80. The output of audio information processor 70 is connected to a first input of audio switch 80. Alphanumeric information from microcomputer 40 is supplied to a first input of video switch 60 through the OSD circuit 50. An image input line 5 is connected at one end to a deck (not shown) or an intermediate-frequency (IF) amplifier (not shown) to receive a video signal of a video program or an IF signal produced in a TV or VTR. Also, the image input line 5 is connected at its other end to the input of a video processor 10 whose output is connected to a second input of video switch 60. An audio input line 15 is connected at one end to the deck or the IF amplifier to receive a reproduced audio signal of a video program or an IF signal. Also, the audio input line 15 is connected at the illustrated end to the input of an audio processor 20 whose output is connected to the second input of audio switch 80. The output of video switch 60 is connected to an image display unit M such as a monitor through a first output line 25. The output of audio switch 80 is connected to an audio output portion SP such as a speaker via a second output line 35.

In operating the device shown in FIG. 1, operation device 30 converts user-designated information into binary key data, and supplies it to microcomputer 40. Operation device 30 has plural control keys and also keys for alphanumeric input, in a known manner.

The OSD circuit 50 converts the alphanumeric data supplied from microcomputer 40 into a video signal which is displayable on image display unit M, and supplies it to the video switch 60.

The audio information processor 70 converts the binary audio data from microcomputer 40 into an analog audio signal which is in turn supplied to audio switch 80.

The buzzer or lamp 90 generates a sound or light when an alarm control signal for indicating the existence of a currently relevant memo and having a certain logic state (high or low) is applied from microcomputer 40.

The video processor 10 and audio processor 20 are used as in a conventional video processing apparatus and serve as the video and audio reproducing circuits in a VTR, or the video and audio demodulators in a television receiver.

The video switch 60 selects and outputs through the first output 25 either the video signal having the character information generated from OSD circuit 50 or the video signal generated from video processor 10.

The audio switch 80 selects and outputs via the second output line 35 either the output of audio information processor 70 or the output of audio processor 20. Here, both audio switch 80 and video switch 60 are switched under the control of microcomputer 40. The microcomputer 40 controls the system in accordance with key data entered through the operation device 30, while it stores and manages various memos which are also entered through operation device 30, and reminds the user of a memorized date one day in advance. For performing these functions, microcomputer 40 includes a real-time counter for counting the date and time, a RAM for storing memo contents, a working buffer, various registers, and a ROM for storing the program, audio messages and character information.

Figure 2:
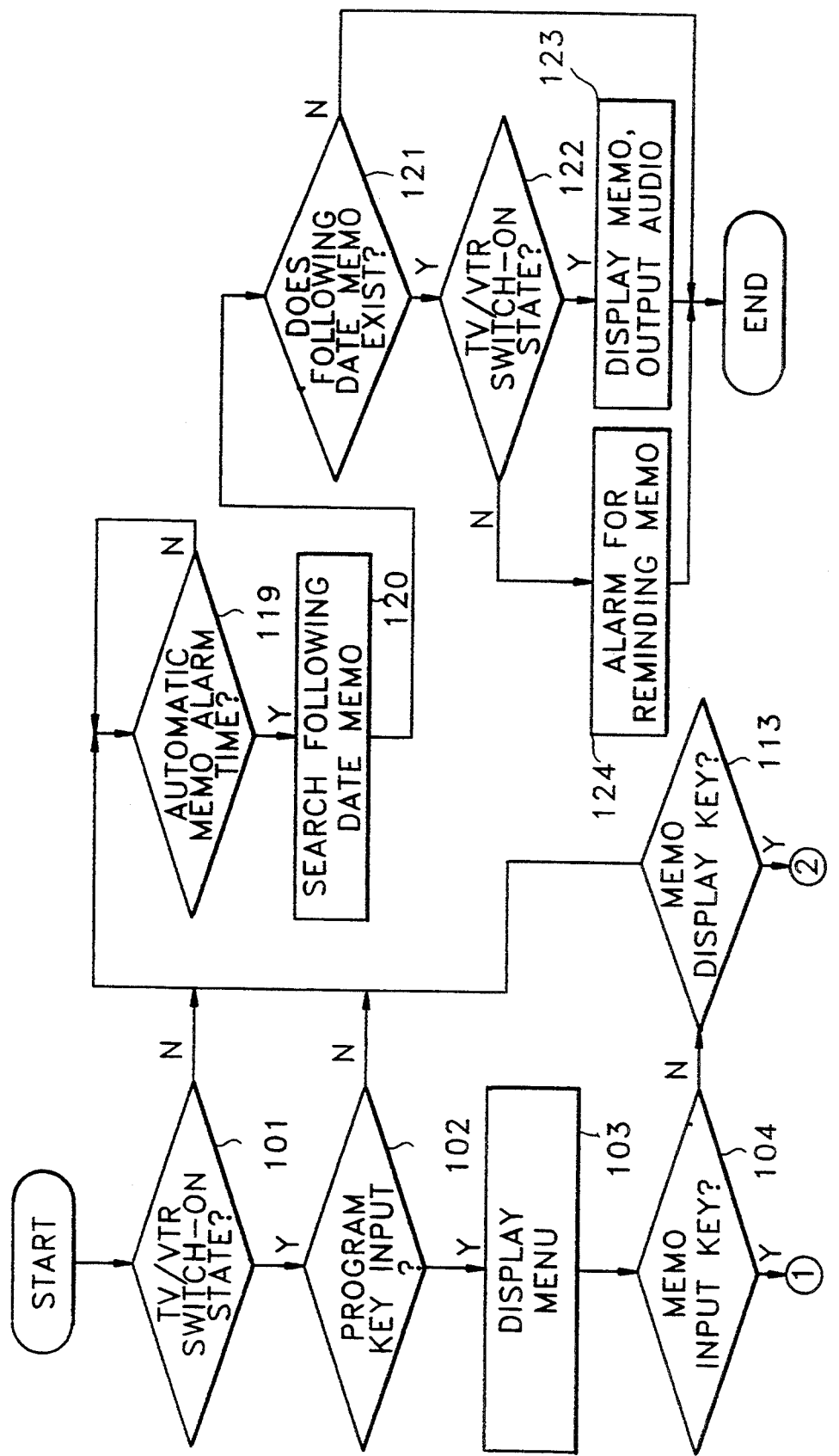
FIG. 2 is a flowchart showing a method for managing memos according to the present invention.
Figure 2:
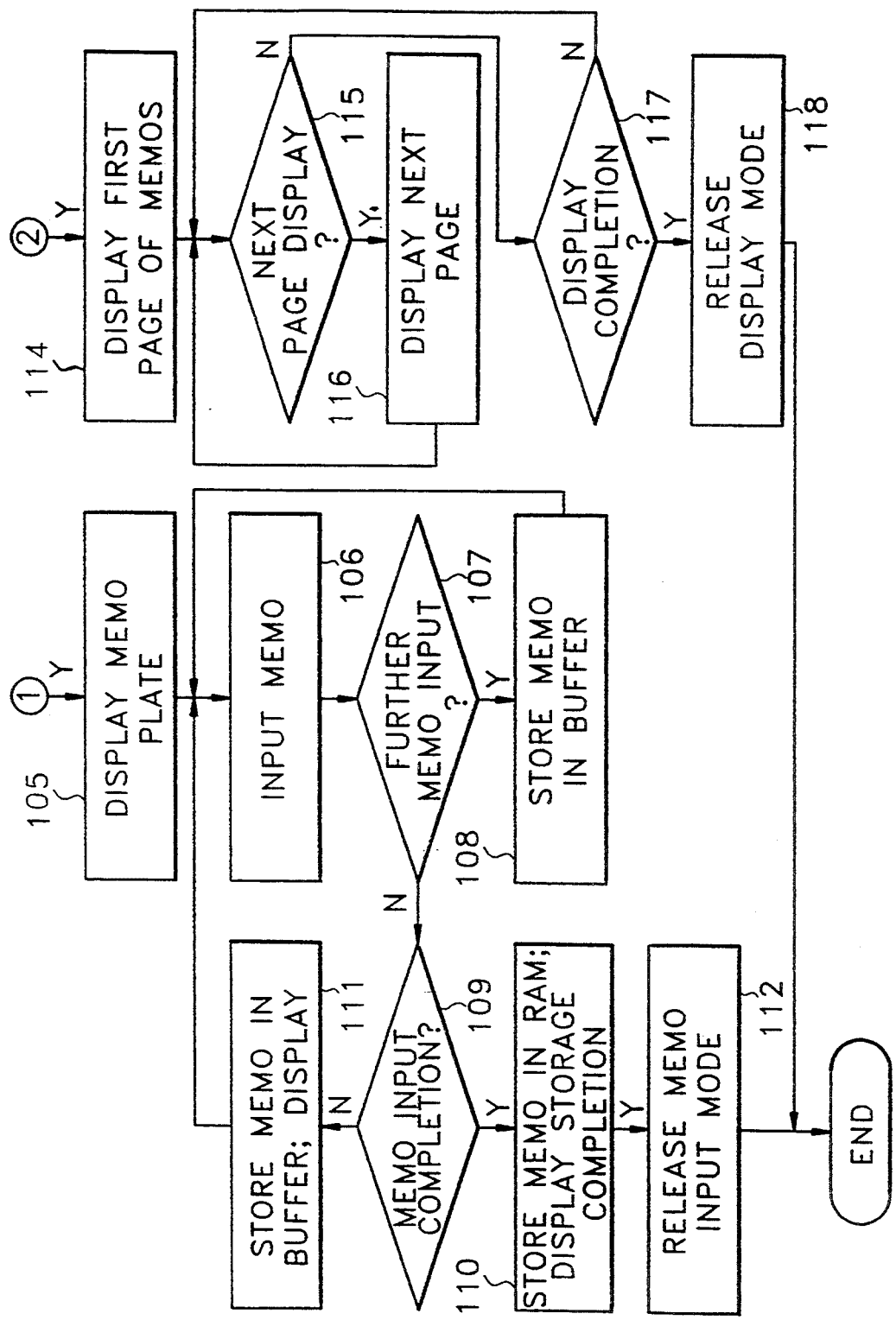

FIG. 2 is a flowchart showing an embodiment of a method for managing memos according to the present invention. The operation of FIG. 2 is carried out by microcomputer 40, and will be described in detail below.

According to FIGS. 1 and 2, microcomputer 40 in the TV receiver or VTR to which the apparatus and method for managing memos according to the present invention is adapted searches for a memo for the following date among the presently stored memos, and automatically reminds the user of the memo's content by image and audio means for an audible or visible alarm. This is done either at a designated alarm time or at a default time which would be the most probable time of viewing the TV or VTR, regardless of whether the user is actually watching the TV or VTR (provided, of course, that the power is supplied to the TV receiver or VTR). In addition, while the user watches a broadcast program on the TV or VTR, or merely when the power switch of the TV receiver or VTR is turned on, the user can input desired memos or display and confirm the stored memos on the screen by pressing a program key on operation device 30.

Turning to the details of the memo management method, attention is directed to FIG. 2. In step 101 of FIG. 2, microcomputer 40 checks whether or not the TV receiver or VTR is switched on, so long as power is supplied to the TV receiver or VTR to which the present invention is adapted. Namely, in step 101, microcomputer 40 checks whether or not the user watches the TV or VTR. When the switch of the TV receiver or VTR is turned on in step 101, microcomputer 40 checks whether or not the program key is pressed on operation device 30, in step 102. When the program key is pressed in step 102, microcomputer 40 instructs stoppage of the display of the TV or VTR program on the screen and mutes the audio (by operation of switches 60, 80), and instead displays a menu on the screen through OSD circuit 50, video switch 60 and first output line 25 by calling out a menu display program stored in a specific address area of ROM within microcomputer 40, in step 103. The function to be selected by the user is presented in the menu, for example, "Will a memo be input?" or "Will a stored memo be displayed?".

Next, microcomputer 40 checks whether or not key data which requests the input or the display of a memo is entered from operation device 30 at predetermined intervals, in steps 104 and 113. When key data demanding memo input is entered in step 104, microcomputer 40 calls out a memo plate display program stored in its own ROM, and displays the memo plate on the screen through OSD circuit 50, video switch 60, and first output line 25, in step 105. The memo plate may be set up in any number of ways, but one particularly effective arrangement is to include a memo type index, which allows frequently used memo texts to be selected by a one-button operation. Examples of such memos would be "Dinner", "Birthday", "Anniversary", "Appointment", "Wedding", etc. This avoids requiring the user to key-in these words every time such an event is scheduled. The memo plate also of course includes sections for memo content and date/time. Thus, after selecting the appropriate memo text (or selecting a "no fixed text" option), the user is prompted for entry of the date and time, an alarm time (if the default time is not to be used) and then for additional memo text, if any. To this end, the operation device 30 includes alphanumeric keys for text input. The memo plate may also include provision for a selectible audio alarm message, such that the user may select from among various audio messages (including different melodies, etc.) in correspondence with each input memo. Alternatively, or in addition, for memos which are input using the "one button" function described above (Birthday, Wedding, etc.) the audio message may be automatically set according to the known content of the memo (i.e., "Happy Birthday" for the "Birthday" memo, etc.). Then, in step 106, the user inputs the desired memos such as the date of an event or meeting to the memo plate displayed on the screen, and, if there is an additional item to be stored in step 107, the user repeats steps 106 through 108 while storing the input memo data in a specific address area of the buffer within microcomputer 40, in step 108.

On the other hand, if there is no additional item to be memorized in step 107, microcomputer 40 determines whether or not the memo input is completed in step 109. Thus, if the memo input continues, the previously input memo data are stored in the buffer and, at the same time, the input memo data are displayed on the screen to allow the user to confirm the input memos. Thus, the operation of steps 106 through 111 are repeated.

In addition, when microcomputer 40 determines completion of the memo input in step 109 (i.e., via a user key operation or expiration of a timer), microcomputer 40 in step 110 stores the memos previously stored in the buffer into the RAM, and then calls the program for indicating storage completion of the memos. This causes display of a "storage completion" message or the completed memos themselves on the screen through OSD circuit 50, video switch 60, and first output line 25. Thereafter, microcomputer 40 releases the memo input mode in step 112, and completes the operation.

If no key data demanding memo input is entered in step 104, microcomputer 40 confirms whether or not data which requests memo display is entered in step 114. When the key data requesting memo display is entered in step 114, microcomputer 40 displays memos corresponding to one page of the memos stored in the RAM on the screen, in step 114. Next, in step 115, microcomputer 40 confirms whether or not key data which requests the display of the next page is entered from the operation device 30. When key data which requests next page display is entered in step 115, the program advances to step 116 to display the memos of the next page, and then performs step 115. If key data which requests the next page display is not entered in step 115, microcomputer 40 checks the entrance of the display completion key data from the operation device 30, in step 117. Therefore, in step 117, when the display completion key data is entered, the display mode is released in step 118, thereby completing the operation. Otherwise, the program proceeds to step 115, where microcomputer 40 checks whether or not the memos of the next page need to be displayed. Then, steps 115 through 118 are repeated.

When the switch of TV receiver or VTR is not switched on in step 101, i.e., when the user is not watching a TV or VTR program, the microcomputer 40 in the memo managing apparatus of the present invention proceeds to step 119. Further, when the TV receiver or VTR power switch is turned on in step 101, that is to say, when the user watches the TV or a VTR program, microcomputer 40 advances to step 119 unless the user presses the program key in step 102. Also, if the user does not press the memo display key in step 113, microcomputer 40 proceeds to step 119. There, microcomputer 40 checks whether the current time of the internal real-time counter corresponds to the memo alarm time designated in the RAM (a user-designated time) or the ROM (the default time) in step 119. If the current time matches the designated memo alarm time in step 119, microcomputer 40 compares the execution date of the memo content stored in the RAM with the value of the date data content in the real-time counter plus 1 in step 120, and searches the memo contents for memos having an execution date of the following date. Thereafter, in step 121, microcomputer 40 checks for the existence of a memo content having an execution date of the following date in accordance with the result of the search in step 120. When a memo content having an execution date of the following date exists in step 121, microcomputer 40 checks again whether or not the switch of the TV receiver or the VTR is turned on. Then, in step 122, when the switch of the TV receiver or the VTR is not turned on, microcomputer 40 instructs buzzer 90 to generate an audible alarm in step 124, and completes the operation. (Alternatively or additionally, a "memo" lamp or the like may be lit.) In accordance with the program stored in the ROM within microcomputer 40, buzzer 90 repeatedly sounds the alarm, e.g., three times for 10 seconds. Also, when microcomputer 40 confirms that the switch of the TV receiver or the VTR is turned on in step 122, microcomputer 40 stops the currently broadcast program of the TV or VTR in step 123, via control of switches 60 and 80, and reads out the memo stored in the RAM to supply it to the screen display device M through OSD circuit 50, video switch 60, and first output line 25. At the same time, microcomputer 40 reads out a message corresponding to the memo content from among the audio alarm messages and appropriate congratulatory or condolatory music messages stored in the ROM, and supplies the corresponding message to an audio output device SP through audio information processor 70, audio switch 80, and a second output line 35. The audio message may be made automatic in some cases or may be designated by the user at the time of memo content entry, and is optional, as mentioned above. On the other hand, when the current time does not correspond to the designated memo alarm time in step 120, microcomputer 40 continuously checks whether or not the current time corresponds to the designated memo alarm time at predetermined time intervals.

As described above, by adding the apparatus of the present invention to the video processing apparatus, memo contents relating to meetings or events designated by the user are stored, to remind the user of the meeting or event through an image screen and audio message one day in advance, and during a selectible time or the most probable time period when the user watches the TV or VTR.

What is claimed is:

1. A method for managing memos in controlling a memo managing apparatus adapted to a video processing apparatus comprising the steps of:
   (a) checking storage commands to determine whether input or display requests for memo data exist;
   (b) inputting and storing memo contents when the memo data input is requested in said step of checking storage commands;
   (c) displaying memos by sequential display of pages of stored memos on a video screen when the memo display is requested in the step of checking storage commands;
   (d) checking a current time to determine whether a stored alarm time has been reached when neither an input nor a display request exists in the step of checking storage commands;
   (e) at said stored alarm time, checking whether a stored memo exists which should be currently brought to a user's attention, and informing the user of said memo if such a memo exists, by displaying said memo on said video screen via said video processing apparatus when said video processing apparatus is in an on-state at said stored alarm time; and
   (f) when said video processing apparatus to which said memo managing apparatus is adopted is in an off-state at said alarm time, outputting an alarm to allow the user to recognize the existence of said memo,
   wherein said step of checking storage commands comprises the steps of:
      checking whether said video processing apparatus to which said memo managing apparatus is adapted is in a turned-on state;
      displaying selection information about requests for inputting and displaying of memo data on said video screen; and
      selecting desired information among the selection information displayed in said display step.

2. A method for managing memos as claimed in claim 1, further comprising a ROM for storing a plurality of audio messages and wherein said step of informing the user further comprises the steps of:
   displaying the desired memo on said video screen concurrently with the output of an audio or a musical message selected from among said plurality of audio messages and corresponding to the memo content, when said video processing apparatus is in an on-state.

3. An apparatus for managing memos in a video processing apparatus which includes a video processor for processing video signals for a video program, said apparatus comprising:

an operation device for entering memo data designated by a user, including date data and memo text;

a microcomputer which stores and manages the memo data entered from said operation device;

an on-screen display (OSD) circuit for converting information generated by said microcomputer into a video signal form to be displayed on a monitor screen;

wherein at a designated time in advance of the date data for a given stored memo, when said video processing apparatus to which said memo managing apparatus is adopted is in the off state, said microcomputer generates at least an alarm signal to alert the user to the presence of a currently relevant memo, and when said video processing apparatus is in the on state, said microcomputer at said designated time causes at least one of said given stored memo to be displayed and said alarm signal to be generated.

4. An apparatus for managing memos as claimed in claim 3, wherein said microcomputer comprises:

a real-time counter for counting a date and time;

a RAM for storing memo contents input by the user;

a ROM for storing an operational program, musical messages and character information in accordance with said memo contents; and a buffer for temporarily storing said memo contents.

5. A method for managing memos in controlling a memo managing apparatus adapted to a video processing apparatus comprising the steps of:

(a) checking storage commands to determine whether input or display requests for memo data exist;

(b) inputting and storing memo contents when the memo data input is requested in said step of checking storage commands;

(c) displaying memos by sequential display of pages of stored memos on a video screen when the memo display is requested in the step of checking storage commands;

(d) checking a current time to determine whether a stored alarm time has been reached when neither an input nor a display request exists in the step of checking storage commands;

(e) at said stored alarm time, checking whether a stored memo exists which should be currently brought to a user's attention, and informing the user of said memo if such a memo exists, by displaying said memo on said video screen via said video processing apparatus when said video processing apparatus is in an on-state at said stored alarm time; and (f) when said video processing apparatus to which said memo managing apparatus is adopted is in an off-state at said alarm time, outputting an alarm to allow the user to recognize the existence of said memo.

* * * * *